United States Patent [19]

Mezger et al.

[11] Patent Number: 4,467,776
[45] Date of Patent: Aug. 28, 1984

[54] DWELL PERIOD CONTROL FOR ENGINE IGNITION

[75] Inventors: Manfred Mezger, Markgröningen; Georg Pfaff, Möglingen; Karl Seeger, Markgröningen, all of Fed. Rep. of Germany

[73] Assignee: Robert Bosch GmbH, Stuttgart, Fed. Rep. of Germany

[21] Appl. No.: 398,348

[22] Filed: Jul. 15, 1982

[30] Foreign Application Priority Data

Jul. 24, 1981 [DE] Fed. Rep. of Germany ....... 3129184

[51] Int. Cl.$^3$ .............................................. F02P 3/04
[52] U.S. Cl. ................................... 123/609; 123/644
[58] Field of Search ................ 123/418, 422, 609, 644

[56] References Cited

U.S. PATENT DOCUMENTS

| 4,174,696 | 11/1979 | Jundt et al. | 123/644 |
| 4,351,306 | 9/1982 | Luckman et al. | 123/609 |
| 4,359,036 | 11/1982 | Seeger et al. | 123/609 |
| 4,366,800 | 1/1983 | Seeger et al. | 123/609 |

Primary Examiner—Tony M. Argenbright
Attorney, Agent, or Firm—Frishauf, Holtz, Goodman & Woodward

[57] ABSTRACT

A countdown counter (14) counts out a speed dependent number to determine the start of the dwell period when a comparison number (Z17) is reached which is adjusted dynamically by a regulation counter (17). The countdown counter's contents are reduced by a value dependent upon acceleration when acceleration is present in order to improve the dynamic correction. In the case of strong accelerations these dynamic corrections are insufficient and when such a strong acceleration occurs the regulation counter content is set to a high value to assure a succession of strong ignition sparks. The high value of acceleration necessary for this precaution may be determined by comparing the difference of successive engine speed counts with a predetermined value or it may be determined by the failure of the current in the ignition coil primary to reach some predetermined value. After the generation of strong sparks is thus assured, the comparison count value provided by the regulation counter gradually returns to normal by the operation of the provisions for normal accommodation to dynamic conditions.

11 Claims, 4 Drawing Figures

DWELL PERIOD CONTROL FOR ENGINE IGNITION

The invention concerns the control of the dwell period length during which ignition current flows in the primary coil of the ignition system of an internal combustion engine, and more particularly the control of the beginning of the dwell period with reference to signals provided by an ignition timing signal generator. The end of the dwell period is when the current in the coil primary is interrupted, the moment that actually produces the spark. The invention concerns such systems in which the length of the dwell period is quickly modified to take account of engine acceleration and other such dynamic events.

In copending U.S. patent application Ser. No. 213,591, filed Dec. 5, 1980 and owned by the Assignee of this application, now issued as U.S. Pat. No. 4,359,036 on Nov. 16, 1982, a system is shown in which a count value, which when reached in a dwell start counter, determines the beginning of the dwell period, is varied in dependence on the current flow in the primary of the ignition coil and also in dependence upon ignition timing signal edges, the count variation being performed by upwards and downwards counting processes. It has been found, however, that in the case of very strong accelerations, these dynamic adjustments are not always sufficient.

THE INVENTION

It is an object of the invention to provide an ignition system in which a further accommodation is made to dynamic conditions when there is a sharp acceleration of the engine, after which the dwell time control gradually returns to the system of the more normal adjustment to acceleration conditions.

Briefly, when acceleration occurs that exceeds a predetermined acceleration threshold, the count value for dwell period start is raised to a high value, above the range of count values reachable by the normal adjusting procedure. In a particularly useful embodiment of the invention, the threshold value of acceleration for this purpose is indicated by the failure of the current in the primary of the ignition coil to reach a predetermined value, preferably the same value which determines the maximum incrementation of the dwell period start count value in normal adjustment to acceleration of the engine. The threshold value of acceleration can also be a fixed value to which digital speed-change signals are compared.

It is further advantageous to derive a count value representative of engine acceleration for the normal adjustment to acceleration and to subtract it from the count value in the counter which determines the beginning of dwell time.

The invention has the advantage that an adequate ignition behavior is assured, even under conditions of powerful acceleration. By the raising of the count value for dwell start to a very high value, very strong sparks are produced in the following cycles, practically independently of exactly how strong the acceleration is. The method of the invention provides practically an emergency setting off of ignition sparks at extreme acceleration when there is a risk that the other provisions for dealing with acceleration will no longer be sufficient. Below this emergency ignition threshold, an acceleration-dependent value is advantageously subtracted from the content of the counter that counts down a speed-dependent count value. This provides outstanding dynamic accommodation of the system that is effective until briefly before the actual determination of the moment of dwell time start, i.e., acceleration information is evaluated practically up to that moment. The raising of the count value for dwell time start and the subtraction of an acceleration dependent value from the counter content are readily combined together and with other known features for dynamic accommodation of the ignition timing system.

A particularly useful way of deriving the acceleration-dependent count value for the above-mentioned subtraction is to compare the count of the counter for providing the speed-dependent count value, not at the time that count value is reached, but at some other place in its cycle, preferably at a signal edge from the timing signal generator other than the one that determines the end of the dwell time, with the count value obtained at that same place in the cycle in the previous cycle and to use the difference as the count value representative of acceleration.

It is further desirable to impose a minimum dwell period in terms of angle of rotation by using a particular fraction of the speed-dependent count value as a minimum for the count value that determines the start of the dwell period when reached in the counter that counts down the speed-dependent count value. This fraction can, for example, be set at 25%. In this way, it is assured that a sufficient dwell period will be available for accelerations beginning at low engine r.p.m.'s.

THE DRAWING

The invention is further described, by way of illustrative example, with reference to the annexed drawings, in which.

DESCRIPTION OF THE ILLUSTRATED EMBODIMENTS

Figure 1:
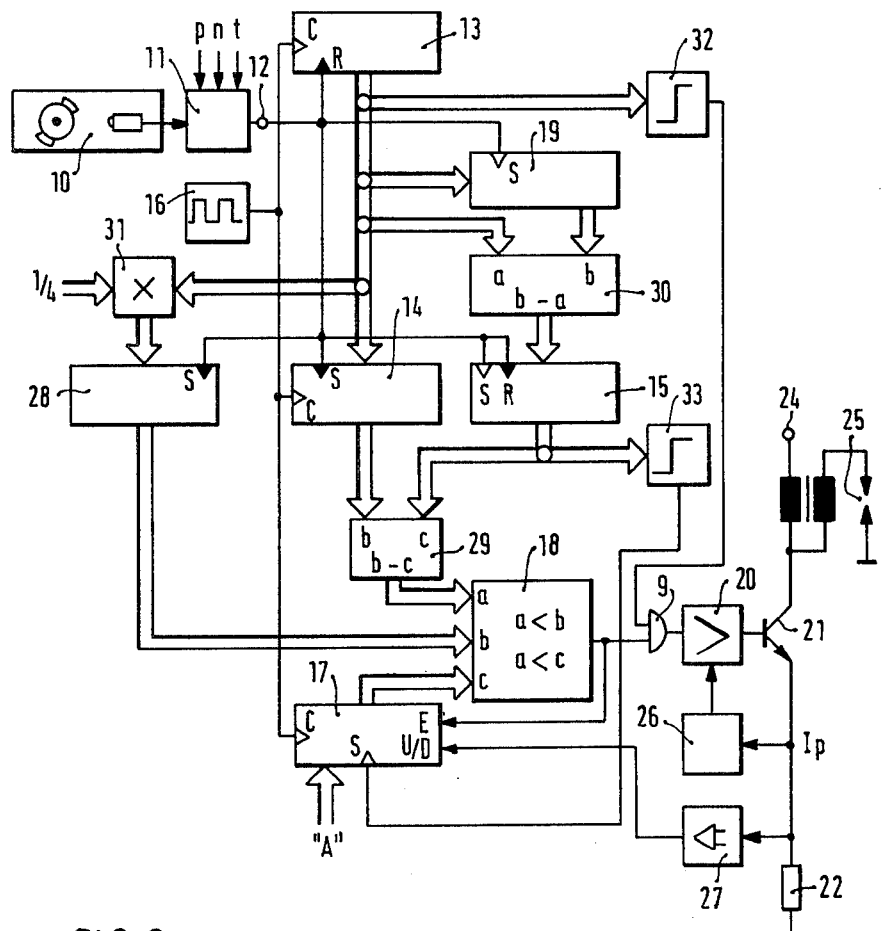
FIG. 1 is a circuit block diagram of a first embodiment of a system for the practice of the invention.

At the upper left in FIG. 1 is shown an ignition timing signal transducer 10 that is preferably driven by the crankshaft or the camshaft of an internal combustion engine. It and the ignition timing computer 11 which may be any of a variety of known kinds for determining the moment of ignition with reference to crankshaft position on the basis of operating parameters (e.g. the pressure p, the engine speed n and the temperature t) form an ignition timing signal generator. The transducer 10 can be, for example, an inductive, an optical, a Hall or a Wiegand transducer. The transducer needs to supply in principle only a single signal edge for each ignition cycle. Consequently this transducer can be simply a unipolar Wiegand transducer. In connection with the method described below for determining acceleration, however, transducers are to be preferred which supply different signal edges for utilization in the system, particularly "segment" transducers. The effect of the segment can of course also be formed electronically in the ignition computer 11. The latter can, for example, be constituted for this purpose in accordance with the disclosure of German patent publication (OS) No. 2 851 336, which corresponds to U.S. Pat. No. 4,267,840.

The output of the ignition computer 11 is brought to the terminal 12 from which it is supplied to the respective reset inputs R of an engine speed counter 13 and an acceleration count value store 15, as well as to the respective setting inputs S of a countdown counter 14, the aforesaid acceleration count value store 15, an intermediate store 19 and a dwell period limit store 28. The set inputs of the acceleration value store 15 and of the intermediate store 19 are controlled by the leading edge of the signal at terminal 12, whereas the other inputs just mentioned are controlled by the trailing edge of the signal.

An oscillator 16 used as a counting pulse generator is connected with the respective counting inputs C of the counter 13, the counter 14 and a fourth counter 17 connected as a regulating counter.

An addition circuit 29 has its inputs b and c directly connected to the count output of the counter 14 and that of the store 15 and provides its output, which is actually that of a subtraction, to the input A of a digital comparator 18, at the other outputs f and c of which there are provided respectively the count output of the store 28 and that of the counter 17. The output of the comparator 18 is provided through an AND-gate 9 and an amplifier 20 to the control input of an electronic switch 21. The switching path of the electronic switch 21 is connected in series with a current measuring resistor 22 and the primary winding of an ignition coil 23 and the series combination is connected between a voltage supply source 24 and ground or vehicle chassis. A spark gap 25 is interposed in the circuit of the secondary of the ignition coil 23, the spark gap in the usual case being an engine spark plug. When there are several spark plugs a mechanical or an electronic high voltage distributor can be provided in a known way. A current regulating device 26 is connected with the current measuring resistor 22 and operates on the amplifier 20 for limiting the primary current, operating, for example, in a manner illustrated in German patent document (OS) No. 2 232 220. The voltage drop produced across the current measuring resistor 20 is also connected through a threshold value comparator 27 with the up/down count input U/V of the regulating counter 17. The reference count value A is preferably applied to the regulating counter 17 by fixed wiring. The enable/disable input E of the regulating counter 17 is controlled by the output of the comparator 18.

The count outputs of the engine speed counter 13 are connected with the respective count inputs of the countdown counter 14, the intermediate store 19 and addition stage 30, a multiplier 31 and a digital threshold value stage 32. The count outputs of the intermediate store 19 are connected to another set of count inputs of the addition circuit 30, which like the circuit 29 actually performs a subtraction. The outputs of the stage 30 are supplied to the acceleration value store 15, which has outputs supplied to a set of count inputs of the addition phase 29 and to the count inputs of a digital threshold stage 33, which, like the threshold stage 32, may be either a digital comparator or an equivalent array of gates. The output of the threshold stage 33 is connected to the set input S of the regulating counter 17.

The count value supplied to the multiplier 31 is multiplied by the fixed factor $\frac{1}{4}$ and the result is supplied from the multiplier's count outputs to the count inputs of the minimum dwell period store 28.

Figure 2:
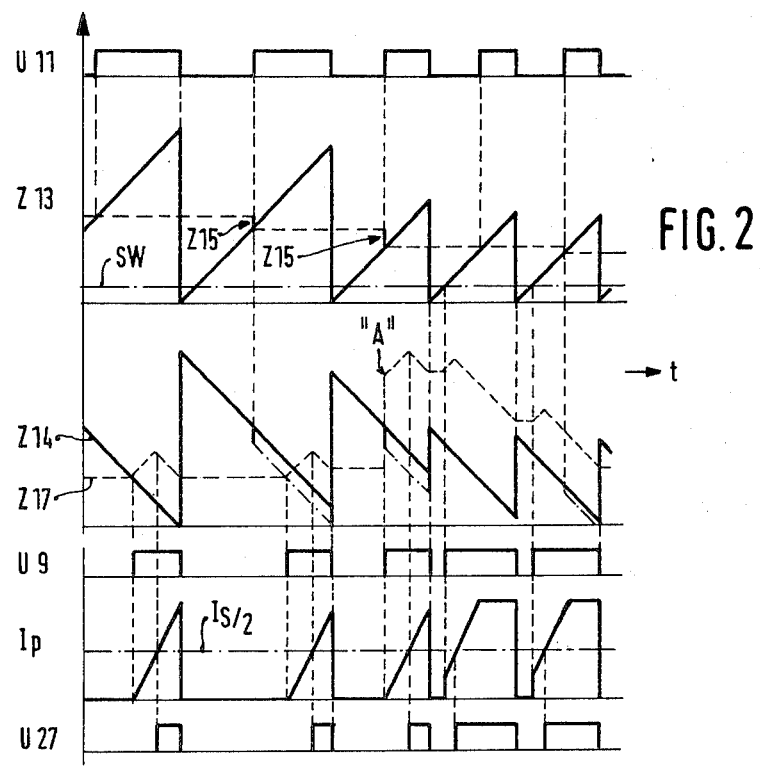
FIG. 2 is a signal diagram for explaining its manner of operation.

The manner of operation of the embodiment illustrated in FIG. 1 will now be explained with reference to the signal diagram provided in FIG. 2.

In the ignition computer 11 there is produced in response to the signal of the transducer 10 an ignition timing signal U11 that is offset in time relative to the transducer signal. The trailing edge of the signal U11 is the computer ignition instant, while the leading edge can be a suitably shifted leading edge of the transducer signal or an internally generated edge of a signal sequence produced with an internally produced keying ratio.

The counter 13 is reset to zero by the trailing edge of the signal U11 and begins again to count upwards by the pulses of the oscillator 16 until it is again reset by the next trailing edge of the signal U11. At the moment of a trailing edge of a signal U11 an actual engine-speed-dependent count value is present in the counter 13 which just before resetting of the latter is taken over into the counter 14 where it is counted downward with the same counting pulses. Delay means, not shown in the drawing, must of course be provided to assure that the transfer of the count to the counter 14 takes place before the resetting of the counter 13, provision for assuring such timing being well-known in the art and not requiring further illustration.

If the engine speed remains constant the final count condition in the counter 14 before a new setting of the counter must be the same count condition as in the previous ignition cycle. If now the addition circuit 29 and the minimum dwell period store 28 are left out of consideration, the count condition of the counter 14 is compared with the count condition of the counter 17 in the comparator 18 and an output signal is produced by the comparator if the count condition Z17 is greater than the count condition Z14. As the result of this comparator output signal, the amplifier 20 is caused to close the electronic switch 21 provided the threshold value SW of the threshold stage 32 is exceeded by the count value Z13 in the counter 13, so as to open the AND-gate 9. These last-mentioned stages assure that a minimum open period is assured for the switch 21. After that switch closes, a primary current $I_p$ begins to flow and stops with the next trailing edge of a U11 signal (ignition instant).

So long as the primary current $I_p$ is smaller than $I_s/2$, half of the ultimately desired current value $I_s$, the regulating counter 17 is switched by the threshold comparator 27 for upward counting. As soon as the threshold value $I_s/2$ is exceeded, the signal at the output of the threshold comparator 27 changes and the regulating counter 27 begins from this moment on to count downward. If the speeds remain constant, the regulating counter 17 reaches its original content value after each up and down counting procedure. In the illustrated case the counting procedure in the regulating counter 17 is performed at the same counter frequency. If a stronger or weaker attack of the regulation is desired, naturally a different counting frequency can be selected according to that choice. In the second up and down count illustrated in FIG. 2 the current value that is reached is too small as the result of an acceleration and the count value Z17 is thereby shifted upwards, so that this value will be reached earlier in the next cycle by the countdown counter, thereby increasing the dwell period. This correction takes place, of course, not only in the case of an acceleration, but also in the case of anything else that reduces the primary current $I_p$, for example a battery voltage decline, and if a correction is also made with deceleration.

Since in the case of strong acceleration this correction of the dwell period start count value V17 raising it to higher values is often insufficient, in addition the count value Z14 is reduced in a manner dependent on acceleration in the system illustrated in FIG. 1. This takes place in jump fashion, provided an acceleration has taken place, at every leading edge of a U11 signal. With each such leading edge the count value Z13 at this moment is transferred into the intermediate store 19. This count value then is preserved into the next ignition cycle and can be compared with the corresponding value in the new cycle. That comparison performs subtraction of the new value from the older one in the adding circuit 30. The difference is then preserved in the acceleration value store 15, to which it is transferred at the moment of the leading edge of a U11 signal. This value remains conserved during the passage of the signal to U11 and is then subtracted from the count value Z14 in the addition circuit 29 before the Z14 count value is transferred to the comparator 18. In this way the onset of the dwell period is advanced by a factor dependent upon acceleration.

The acceleration-dependent value Z15 obtained by the difference of two successive speed count values is also supplied to the threshold stage 33 which responds with an output signal if the value is above a previously fixed limit value. That output signal sets the content of the regulating counter 17 to the value A. This threshold value is chosen so high that this boost occurs only at very high accelerations and may be considered essentially as an emergency ignition measure. This emergency ignition produces a series of very strong ignition sparks that gradually return to normal size again by the up and down count procedures of the regulation counter 17. In this way the possibility of the provision of a series of very weak ignition sparks during strong acceleration is prevented.

By the provision of a minimum open time of the switch 21 assured by the components 9 and 32 the dwell time is prevented from becoming so long as to interfere with the effectiveness of the sparks. The return to a normal value can in the simplest case also be time-controlled.

As further explained in the references mentioned in the introduction to the specification, the dwell period has a minimum, usually determined in units of angular rotation, for lower engine speeds lying below 1000 r.p.m. in modern ignition systems. If acceleration is to be produced beginning in this speed range, there is particularly great danger that excessively weak sparks or no sparks at all will be produced as a result of insufficient dynamic accomodation. For this reason, by means of the components 28 and 31, in connection with the comparator 18, a basic dwell angle is superimposed as a minimum value on the dwell angle regulated by the remainder of the system. This minimum dwell angle is provided in FIG. 1 by a lower limit of ¼ of an ignition cycle. This is produced by multiplying the count Z13 as it is being counted up, by the factor ¼ in a multiplier 41 so that when the count Z13 reaches its maximum at the time of a trailing edge of a U11 signal the multiplier output will be stored in the dwell angle limit store 28. The comparator 18 is so wired that the dwell period is started when the difference Z14 - Z15 becomes smaller than the count Z17 or smaller than the count Z28, whichever occurs first. The evaluation factor can naturally be chosen at some value other than ¼. By this method the range of very small dwell angle in the range of flow engine speeds can be systematically boosted, which in the normal case means dwell periods that are too long. This is of no harm for operation and, on the other hand, provides a dwell time reserve available in case of acceleration.

Figure 3:
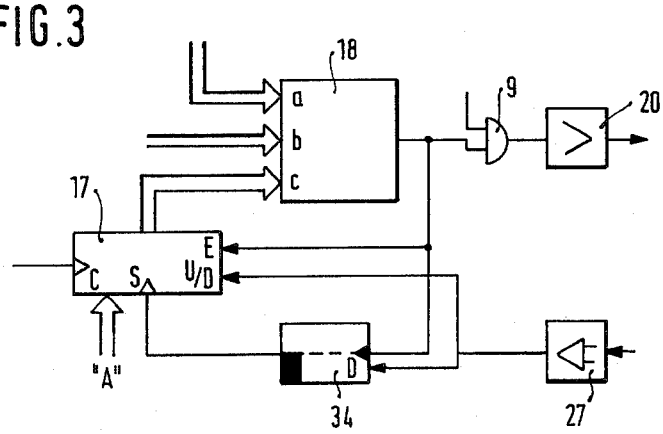
FIG. 3 is a partial circuit block diagram of a second embodiment of a circuit for practice of the invention.

The second illustrative embodiment illustrated in FIG. 3 corresponds basically to the first embodiment illustrated in FIG. 1. Identical and similarly interconnected components are not reproduced in the figure for simplification of presentation. The threshold value stage 33 is dispensed with. Instead, the output of the comparator 18 is additionally connected with the synchronizing input of a D flip-flop 34, the output of which is connected to the set input of the regulating counter 17. The D input of this flip-flop 34 is connected with the output of the threshold value comparator 27.

Figure 4:
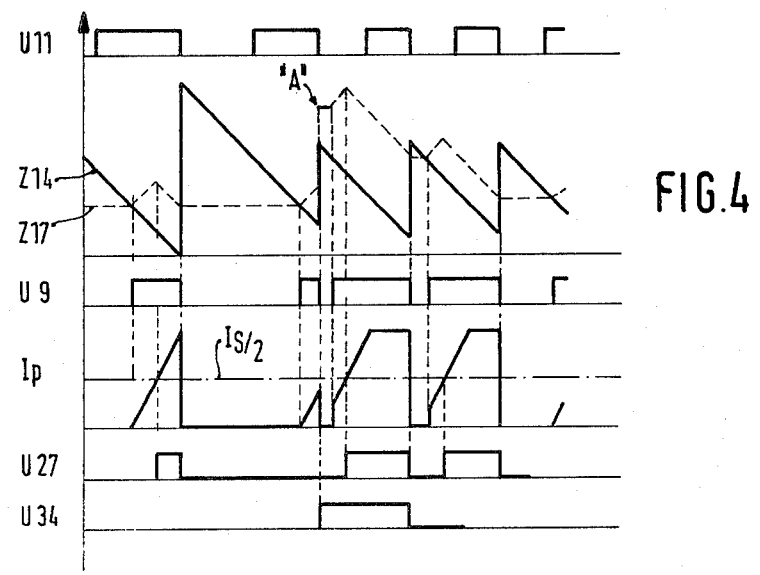
FIG. 4 is a signal diagram for explaining the operation of the circuit of FIG. 3.

The second embodiment differs from the first merely by the manner of determining the acceleration limit at which the boosting of the dwell time start count value Z17 to the value A takes place. In this case, the difference between two successive speed count values is not applied, but instead the criterion is whether the value of the primary current $I_p$ reaches the boundary value $I_s/2$ by the time the trailing edge of a U11 signal arrives. If this boundary value is not reached, the boosting of the count value Z17 to the value A takes place. When this limit value is overstepped in normal operation, at the instant of the trailing edge of the U11 signal an output signal of the threshold value comparator 27 is present. The flip-flop 34 is thus set at every trailing edge of a U11 signal, i.e. it remains continuously set. This in turn means the continuous presence of a 0 signal at the complementary output of this flip-flop 34 which is connected with the set input of the regulation counter 17. If in the case of strong acceleration (second illustrated cycle in FIG. 4) the current value $I_s/2$ is not yet reached when the trailing edge of a U11 signal appears, there is at this instant not yet an output signal of the threshold value comparator 27 and the flip-flop 34 is reset. This produces a 1 signal at its complementary output, by which the regulating counter 17 is set to the value A. The consequences of that operation are essentially the same as in the first embodiment.

Although the invention has been described with reference to two particular illustrative embodiments, it will be understood that other modifications and variations are possible within the inventive concept.

We claim:

1. Method of dwell period control for engine ignition with reference to signals provided by an igntion timing signal generator (10,11) comprising the steps of:
periodically counting out downwards, in a first counter (14), an engine-speed-dependent count value in repetitive response to an edge of each of successive signals from said signal generator;
establishing a count value for dwell period start and causing the start of the dwell period in the engine's ignition circuit when said dwell period start count value is reached by said first counter;
adjusting said dwell period start count value with reference to the current flow magnitude in said ignition circuit in the previous dwell period;
raising said dwell period start count value to the the same predeterminedly fixed high value (A), above the range of count values reachable by the adjusting procedure, whenever engine acceleration exceeds a predetermined acceleration threshold, and returning said dwell period count value thereafter to the normal range in subsequent ignition cycles by the normal operation of the means used for the dwell period start count value adjusting procedure.

2. Method as defined in claim 1, in which the further step is provided of deriving a count value (Z15) representative of engine acceleration, and subtracting said last-mentioned count value from the count value in said first counter during the counting out step, and thereby advancing the dwell period start in the next ignition cycle.

3. Method as defined in claim 2, in which the step of adjusting the dwell period start count value is performed by incrementing said dwell period start count value during the dwell period until a predetermined value of ignition circuit current is reached, and then decrementing said count value until the end of the dwell period.

4. Method as defined in claim 2, in which the step of deriving said acceleration-representing count value is performed with a second counter (13) which is used for providing said speed-dependent count value in successive ignition cycles to said first counter (14), the acceleration count value being derived by comparing the count value in said second counter at a predetermined angular place in the ignition cycle with the count value at the same angular place in the previous ignition cycle, and using the resulting difference as the acceleration representing count value.

5. Method as defined in claim 4, in which the content of said second counter (13) is changed at the end of the dwell period, and in which said predetermined angular place is the edge of a signal from said generator other than the one which in each cycle terminates the dwell period.

6. Method as defined in claim 4 or claim 5 in which said acceleration count value is compared with a predetermined acceleration count value for determination of the occurrence of engine acceleration exceeding said acceleration threshold.

7. Method as defined in claim 1, in which the occurrence of acceleration exceeding said predetermined acceleration threshold is determined by comparing the current in said ignition circuit during the dwell period with a predetermined current value ($I_s/2$) and treating the failure of the actual current value to reach said predetermined current value as an indication of acceleration exceeding said acceleration threshold.

8. Method as defined in claim 3, in which the failure of the ignition current to reach said predetermined current value during a dwell period is treated as an indication of the occurrence of engine acceleration exceeding said acceleration threshold.

9. Method as defined in claim 8, in which said count value (17) for dwell period start is limited by a predetermined fraction of said engine-speed-dependent count value as a minimum.

10. Apparatus for dwell period control in an engine ignition system having an interruptor switch (21) in the primary circuit of an ignition coil and an ignition timing signal generator (10,11) providing in each ignition cycle a first signal edge for timing events preceding the initiation of an engine spark discharge and a second signal edge for timing the initiation of an engine spark discharge and further comprising, for dwell period control of said interrupter switch:

first counting means (14) for periodically counting out downwards an engine-speed-dependent count value in repetitive response to said first signal edge of signals provided by said ignition timing signal generator (10,11);

means for establishing a count value for dwell period start and causing the dwell period of said interruptor switch to begin when said first counting means reaches said dwell period start count value;

means for adjusting said dwell period start count value with reference to the current flow magnitude in said ignition circuit in the previous dwell period;

means for raising said dwell period start count value to the same predeterminedly fixed high value (A), above the range of count values reachable by said adjusting means, whenever engine acceleration exceeds a predetermined acceleration threshold.

11. Apparatus for dwell period control in an engine ignition system having an interruptor switch (21) in the primary circuit of an ingition coil and an ignition timing signal generator (10,11) providing in each ignition cycle a first signal edge for timing events preceding the initiation of an engine spark discharge and a second signal edge for timing the initiation of an engine spark discharge and further comprising, for dwell period control of said interrupter switch:

first counting means (14) for periodically counting out downwards an engine-speed-dependent count value in repetitive response to said first signal edge of signals provided by said ignition timing signal generator (10,11);

means for establishing a count value for dwell period start and causing the dwell period of said interruptor switch to begin when said first counting means reaches said dwell period start count value;

means for adjusting said dwell period start count value with reference to the current flow magnitude in said ignition circuit in the previous dwell period;

means for raising said dwell period start count value to the same predeterminedly fixed high value (A), above the range of count values reachable by said adjusting means, whenever the current flow magnitude in said ignition circuit has failed to reach a predetermined magnitude of current flow in the previous dwell period.

* * * * *